United States Patent [19]
Thorud et al.

[11] Patent Number: 5,195,307
[45] Date of Patent: Mar. 23, 1993

[54] SIMPLIFIED BLADE BRAKE CLUTCH AND PROPULSION CONTROL

[75] Inventors: Richard A. Thorud; Nathan J. Friberg, both of Bloomington, Minn.

[73] Assignee: The Toro Company, Minneapolis, Minn.

[21] Appl. No.: 823,502

[22] Filed: Jan. 21, 1992

[51] Int. Cl.[5] .................. A01D 69/00; A01D 75/20
[52] U.S. Cl. ................................. 56/11.3; 56/11.8; 74/480 R
[58] Field of Search .............. 56/10.8, 11.3, 11.8, 56/DIG. 18; 74/480 R

[56] References Cited

U.S. PATENT DOCUMENTS

| | | | |
|---|---|---|---|
| 4,212,141 | 7/1980 | Miyazawa et al. | 56/11.8 |
| 4,538,401 | 9/1985 | Takamizawa et al. | 56/11.8 |
| 4,747,256 | 5/1988 | Sadakane | 74/480 R X |
| 4,882,897 | 11/1989 | Oshima et al. | 56/11.3 |
| 4,932,192 | 6/1990 | Ishimaru | 56/11.8 |

OTHER PUBLICATIONS

The Toro 21" Recycler mower operator's manual, form number 3314-286 revision B, copyright 1990 to The Toro Company, p. 6.
The Lawn-Boy operator's manual, part number 613952, copyright 1989 to Lawn-Boy Inc., section CS1BSN, pp. 15 and 16.

Primary Examiner—David J. Bagnell
Attorney, Agent, or Firm—Donald S. Trevarthen

[57] ABSTRACT

In a walk-behind power lawn mower with a propelling mechanism and a blade brake clutch, an improved control system. A preferred embodiment includes a substantially U-shaped control arm (34), pivot shaft (36, 38) operatively connecting control arm (34) to handlebar (28) wherein the pivot shafts (36, 38) establish a pivot axis. The preferred embodiment also includes a first element (48) pivotally connected to the handlebar (28) and operatively connected to the propelling mechanism and a second element (58) pivotally connected to the handlebar (28) and operatively connected to the blade brake clutch (16) wherein the first element (48) is rotationally displaced and the propelling mechanism is engaged when the control arm (34) is generally rotated about the pivot axis and wherein the first and second elements (48, 58) are rotationally displaced and the propelling mechanism and blade brake clutch (16) are engaged when the control arm (34) is first generally displaced axially along the pivot axis and then generally rotated about the pivot axis.

6 Claims, 5 Drawing Sheets

SIMPLIFIED BLADE BRAKE CLUTCH AND PROPULSION CONTROL

TECHNICAL FIELD

This invention pertains to lawn mower controls. Specifically, this invention pertains to a simplified propelling and blade brake control for power lawn mowers.

BACKGROUND OF THE INVENTION

Power lawn mowers typically incorporate one or more controls for operating various systems on the mower. Among these controls are the engine speed control, engine on/off control, engine choke control, mower propulsion control, and a blade brake clutch (BBC) control. This invention centers on the Propulsion and BBC controls.

Lawn mower propulsion controls are utilized on lawn mowers that are "self-propelled." "Self-propelled" mowers incorporate a power transmission system which transmits engine power to the mower wheels to propel the mower. The propulsion control is typically located on the handlebar assembly of the lawn mower for ease of operator access. The propulsion control allows the operator to start or stop the transmission of power from the engine to the wheels. Some propulsion controls also allow the operator to choose a propulsion speed by changing gear ratios within the power transmission system. Furthermore, the operator can usually change the propulsion speed of the mower by varying the engine speed control which is also typically mounted on the handlebar assembly.

BBC controls are also typically mounted on the mower handlebar assembly. Blade brake clutches control the transmission of power between the mower engine and the cutting blade. The blade brake clutch typically operates in one of two modes. In the first mode, the engine does not transmit power to the mower blade, and the blade is braked so as to prevent rotation. In the second mode, the brake is released from the mower blade and the engine and blade are operatively coupled so that power is transmitted from the engine to the mower blade. Typically, a control is mounted on the handlebar of the mower so that the operator can select one of the two modes of operation of the BBC. The BBC handlebar control mechanism is typically configured so that the BBC cannot be put into the second mode by an inadvertent movement on the operator's part. Safety concerns mandate that the BBC control requires an intentional, multi-direction movement of the control by the operator to put the BBC into the second mode of operation. Without this requirement, inadvertent contact of the BBC control by the operator could result in engagement of the mower blade.

Blade brake clutches and their controls also typically incorporate means biasing the BBC to the first mode of operation wherein the blade is braked and the engine is disconnected from the blade.

One prior art BBC control incorporates an integral propulsion control. In this control, the operator can choose to propel the mower by lifting the combination control bail upward. By doing so, the propulsion system is engaged but the BBC stays in the first mode of operation wherein the blade is braked and the engine is operatively disconnected from the blade. If the operator releases the control bail, the propulsion of the mower stops and the control returns to its neutral position. If the operator then wants to put the BBC into the second mode of operation, the operator must push down on the bail and then pull the bail up to the same position the bail was at in the propulsion mode. This two step movement of the bail by the operator results in the BBC transmitting power from the engine to the now un-braked blade, and the transmission of power from the engine to the mower wheels for more propulsion. If the operator now releases the control bail, the control bail returns to neutral, the mower propulsion stops, and the BBC returns to its first mode of operation wherein the blade is braked and the engine is operatively disconnected from the mower blade.

Another prior art control system provides separate control bails for propulsion and BBC operation. This system provides one control bail for propulsion. The operator must lift the propulsion control bail to engage the mower propulsion system, which then transmits power from the engine to the mower wheels, propelling the mower. If the operator releases the propulsion control bail, the propulsion system is disengaged and the propulsion of the mower is stopped. The propulsion control bail also returns to its neutral position. If the operator then wants to put the BBC into the second mode of operation, the operator must push a BBC finger control interlock switch forward, and then pull the BBC bail control back. The movement of the two BBC controls by the operator results in the BBC transmitting power from the engine to the now un-braked blade, causing the blade to rotate. The operator may still also control the propulsion of the mower by moving the propulsion control bail in the manner described above. If the operator releases the BBC control bail, the control bail returns to neutral and the BBC returns to the first mode of operation wherein the blade is braked and the engine is operatively disconnected from the mower blade.

The present invention offers an alternate method of engaging the mower propulsion system and BBC. In particular, a preferred propulsion and BBC control system according to the present invention accommodates ease of operation in that it incorporates a control arm operatively coupled to a BBC and a mower propelling means and also incorporates pivot means operatively connecting the control arm to the lawn mower wherein the pivot means establishes a pivot axis and wherein the propelling means is engaged when the control arm is generally rotated about the pivot axis and wherein the BBC and the propelling means are engaged when the control arm is generally displaced axially along the pivot axis and then generally rotated about the pivot axis.

SUMMARY OF THE INVENTION

Accordingly, the present invention includes an improved lawn mower propelling and blade brake clutch control.

Specifically, this invention includes, in a walk-behind power lawn mower with a propelling means and a BBC, an improved control system that includes a control arm operatively coupled to the BBC and the propelling means and also includes a pivot means operatively connecting the control arm to the lawn mower wherein the pivot means establishes a pivot axis and wherein the propelling means is engaged when the control arm is generally rotated about the pivot axis and wherein the BBC and the propelling means are engaged when the control arm is first displaced axially along the pivot axis and then generally rotated about the pivot axis.

Another embodiment of this invention could include pivot means that establish a substantially horizontal pivot axis.

Another embodiment of this invention could include a substantially U-shaped control arm, pivot means operatively connecting the control arm to the handle assembly wherein the pivot means establishes a pivot axis, a first element pivotally coupled to the handle assembly and operatively connected to the propelling means, a second element pivotally coupled to the handle assembly and operatively coupled to the BBC wherein the first link is rotationally displaced and the propelling means is engaged when the control arm is generally rotated about the pivot axis and wherein the first and second links are rotationally displaced and the propelling means and BBC are engaged when the control arm is first generally displaced axially along the pivot axis and then generally rotated about the pivot axis.

BRIEF DESCRIPTION OF THE DRAWING

The invention will be further described with reference to the appended Drawing wherein.

DETAILED DESCRIPTION OF A PREFERRED EMBODIMENT

Figure 1:
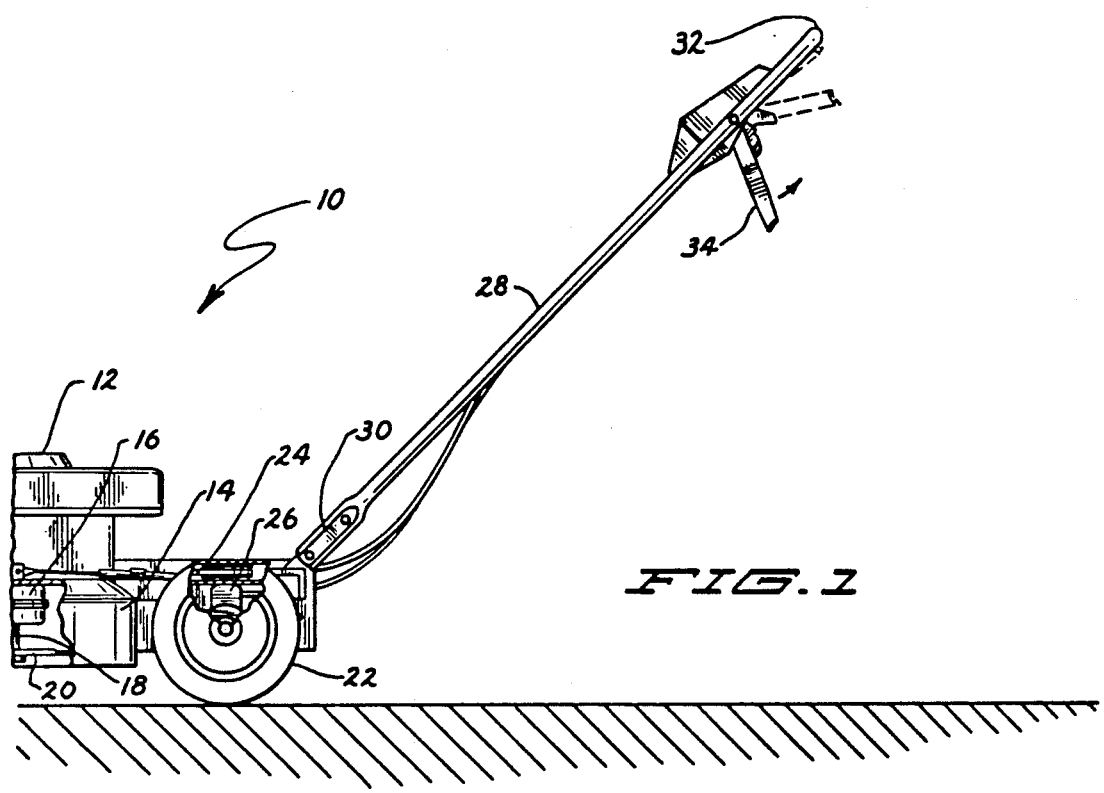
FIG. 1 is a side elevational view of a lawn mower with a blade brake clutch, a propelling means and a control according to the preferred embodiment of the present invention.

In the Drawing, wherein like reference numerals designate like parts and assemblies throughout the several views, FIG. 1 shows a preferred walk-behind rotary lawn mower 10 with an engine 12 which is typically powered by gasoline. The engine 12 mounts on a deck 14 and the output shaft of the engine (not shown) is operatively connected to a blade brake clutch (BBC) 16. The BBC 16 has an output member 18 which is connected to a rotary blade 20. The BBC 16 typically operates in one of two modes. In the first mode, the engine does not transmit power to the mower blade 20 and the blade 20 is braked by the BBC 16 so as to prevent rotation of the blade 20. In the second mode, the brake is released from the mower blade 20, and the engine 12 and blade 20 are operatively coupled so that power is transmitted from the engine 12 to the mower blade 20. The BBC 16 can be placed into and out of each mode of operation by the operator via controls which will be discussed in detail below.

The preferred mower 10 also includes wheels 22. Wheels 22 are driven, when so desired by the operator, by power from the engine 12 which is transmitted through the drive belt 24 and the transmission 26. The transmission of power can be started or stopped by the operator via controls which will be discussed in detail below.

Figure 2:
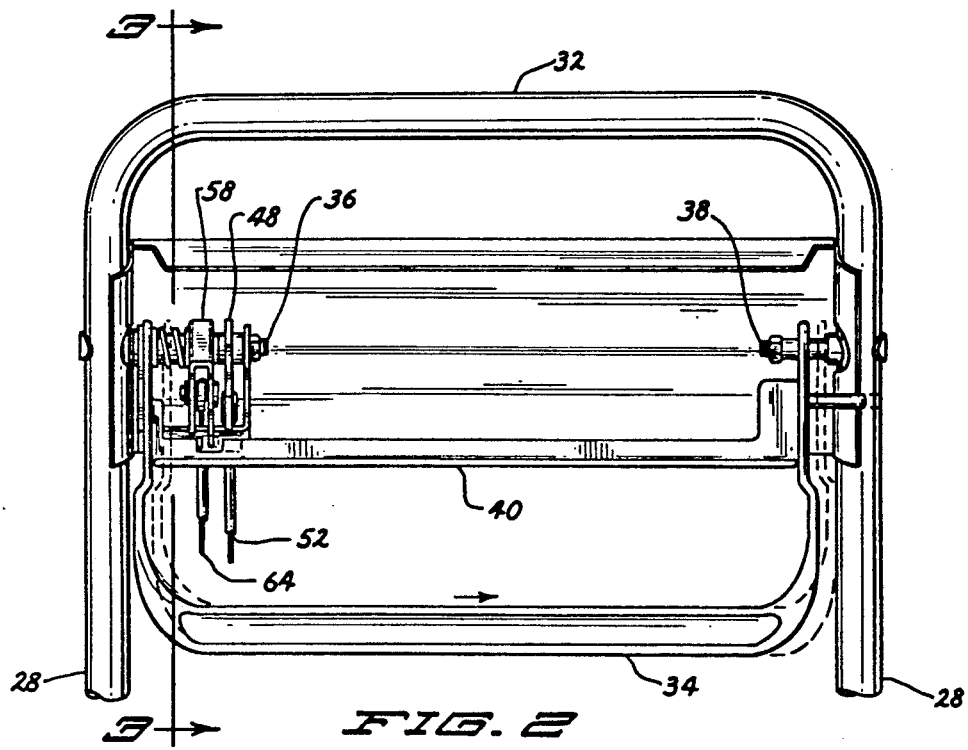
FIG. 2 is an enlarged rear elevational view of a portion of the lawn mower of FIG. 1.

As depicted in FIG. 2, the preferred mower 10 also includes a handlebar assembly 28 that connects to the mower deck 14 at connection points 30. Handlebar 28 includes an operator gripping surface 32 which extends horizontally between the legs of the handlebar 28.

A control arm 34 is shown in FIG. 2. Control arm 34 is a generally U-shaped formed steel member operatively coupled to the handlebar 28.

FIGS. 3, 4, 5 and 6 show the preferred control system of the present invention in more detail. The left side of control arm 34 is connected to handlebar 28 by, and pivots about, shaft 36. The right side of control arm 34 is connected to handlebar 28 by, and pivots about, shaft 38 (see FIG. 2). Control arm 34 includes a cross member 40 which extends horizontally between the legs of the U-shaped control arm 34. Cross member 40 includes a notch 42 which is formed in an engagement surface 44 which is integral with cross member 40. The engagement surface 44 extends, as does the cross member 40 to which it is integral with, horizontally between the legs of the U-shaped control arm 34. A tab 46 is formed integral with engagement surface 44. The functions of tab 46, notch 42, engagement surface 44, cross member 40 and control arm 34 and their interaction with other components will be described in more detail below.

Figure 3:
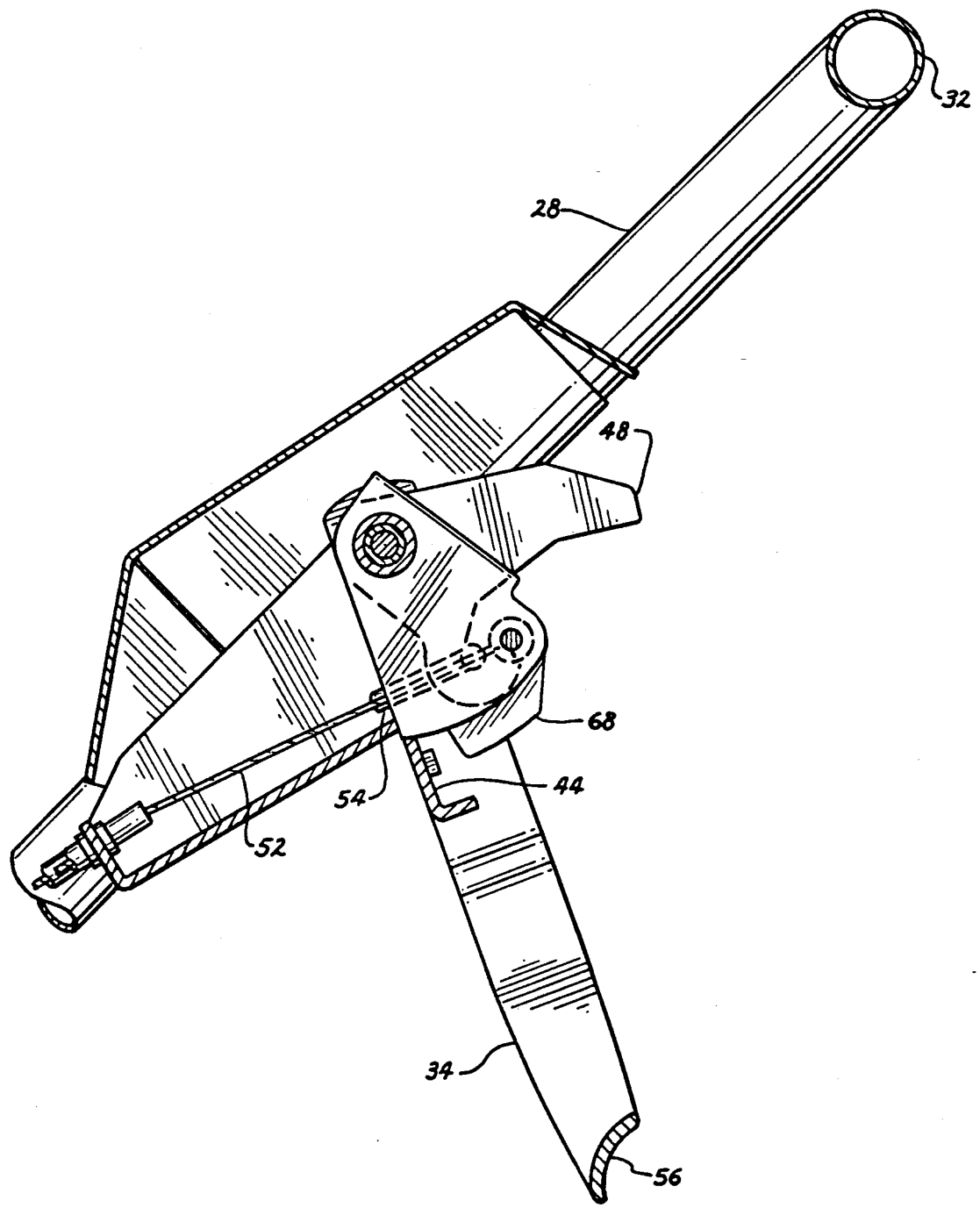
FIG. 3 is a side sectional view taken along line 3—3 of FIG. 2 of the preferred control mechanism according to the present invention with the control in its neutral position.
Figure 4:
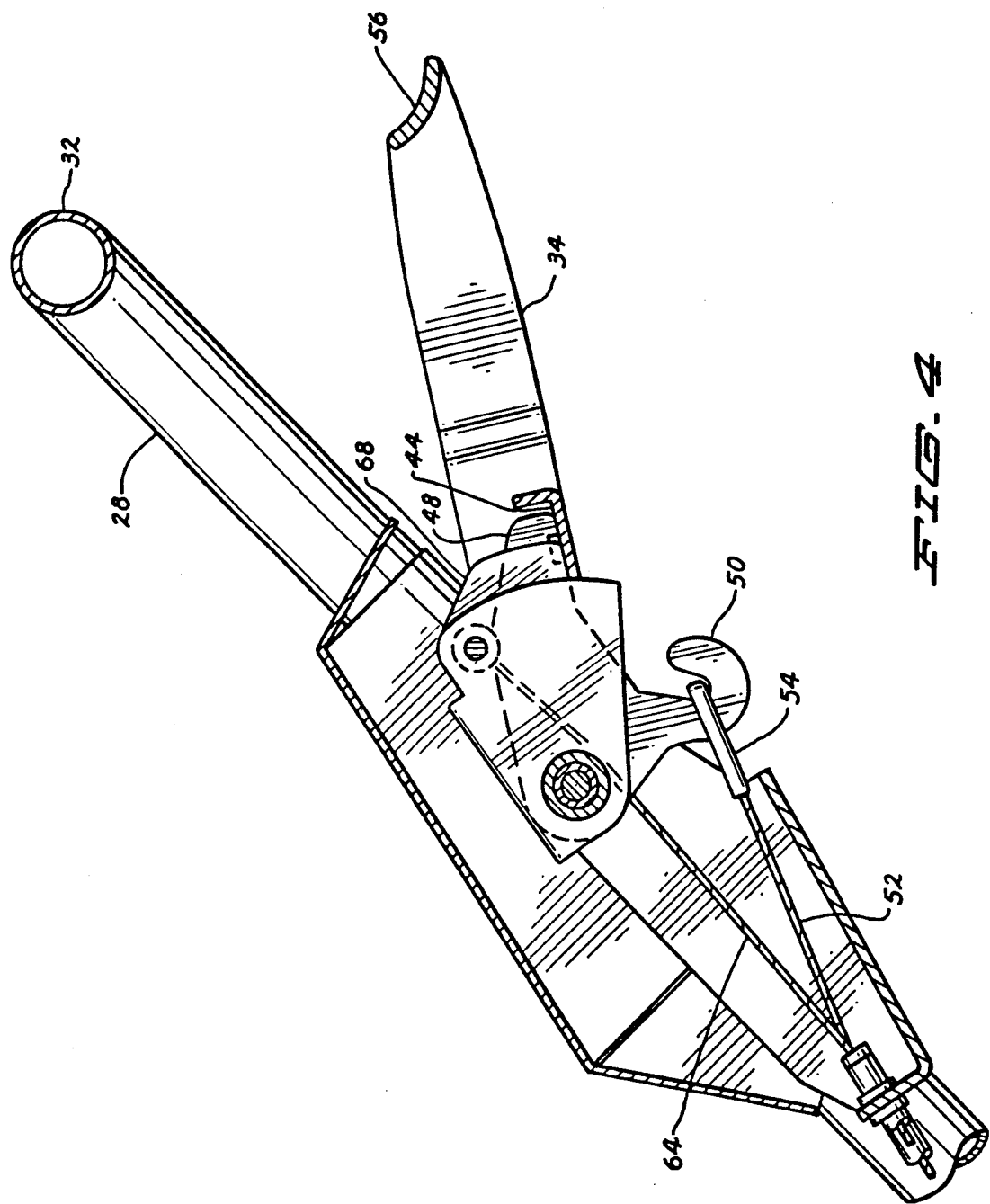
FIG. 4 is a side sectional view taken along line 3—3 of FIG. 2 of the preferred control mechanism according to the present invention with the control in a position between neutral and engaged.
Figure 5:
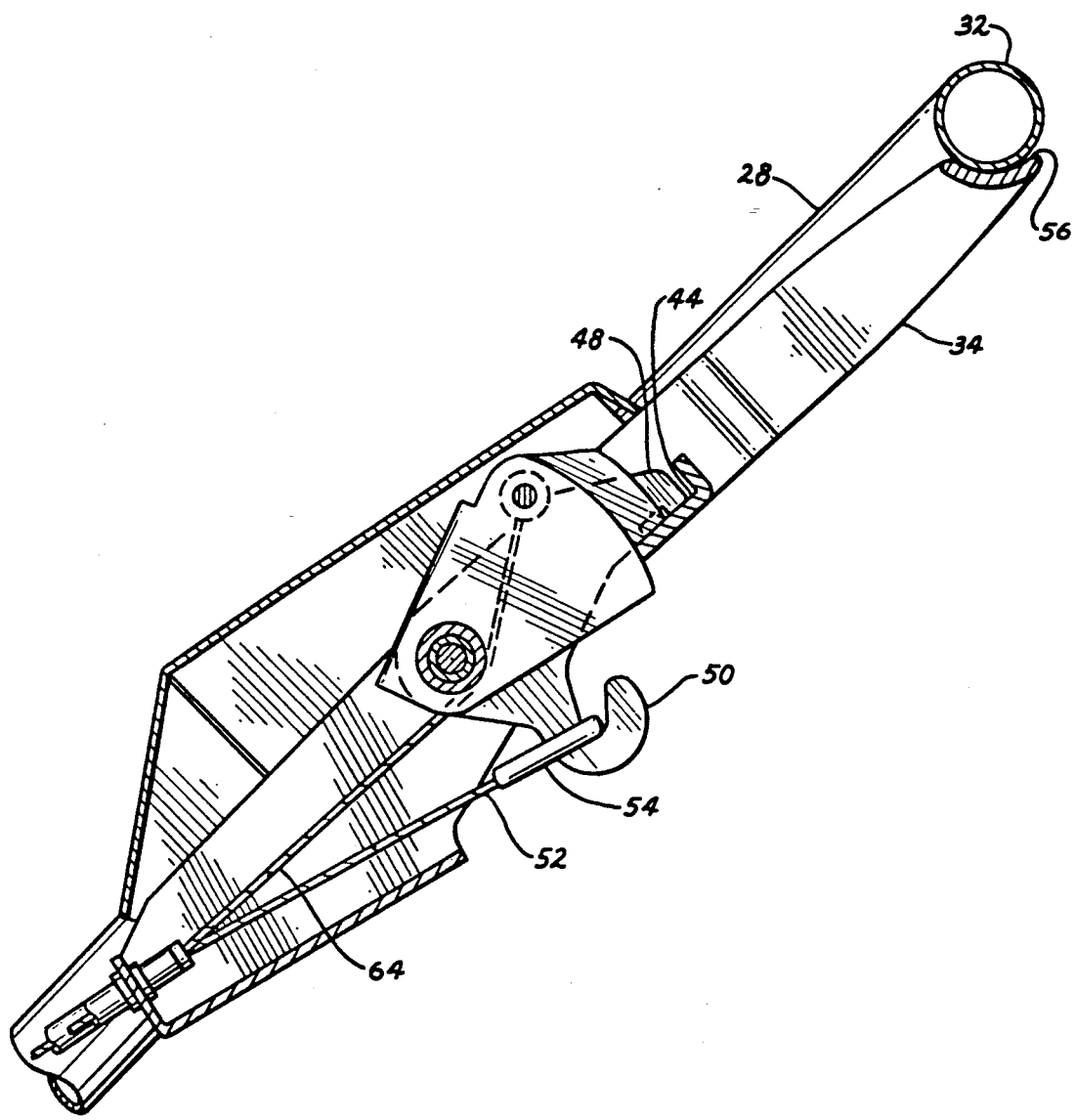
FIG. 5 is a side sectional view taken along line 3—3 of FIG. 2 of the preferred control mechanism according to the present invention with the control in the fully engaged position.

An element 48 is connected to and pivots about shaft 36. Element 48 includes a hook 50 extending in a generally downward direction. Cable 52 has an end 54 which engages the hook 50. Cable 52 is connected, at its end opposite to end 54, to the mower transmission 26. Movement of the cable 52 in an upward direction causes the transmission 26 to transmit power from the engine 12 to the wheels 22, thus propelling the mower. Movement of the cable 52 in a downward direction causes the transmission 26 to stop transmission of power from the engine 12 to the wheels 22, thus, stopping the mower. Movement of the cable 52 is controlled by the operator through movement of control arm 34. As control arm 34 is rotated upward by the operator, the engagement surface 44 contacts element 48. Contact between element 48 and engagement surface 44 occurs as control arm 34 has been rotated to a point shortly before surface 56 contacts gripping surface 32. As control arm 34 is rotated further to the point where surface 56 contacts gripping surface 32, element 48 is further rotated due to its contact with engagement surface 44. Rotation of element 48 causes hook 50 to rotate, pulling cable end 54 and cable 52 in an upward direction. As cable 52 is pulled upward, the transmission 26 transmits power from the engine 12 to the wheels 22, thus propelling the mower. If the operator releases the control arm 34, the transmission 26 exerts a force on cable 52 which tends to pull cable 52 back towards the transmission 26. Cable 52 and cable end 54 then pull hook 50, causing element 48 to rotate downward, thus, rotating control arm 34 so that surface 56 falls away from gripping surface 32. While the transmission 26 continues to exert force on cable 52, it stops transmitting power from the engine 12 to the wheels 22, stopping the propulsion of the mower 10. Eventually, the transmission 26 returns to a neutral position and the transmission 26 stops exerting force on the cable 52. As cable 52 and cable end 54 stop pulling on hook 50, downward rotation of element 48 stops. At that point, control arm 34 rotates back to its neutral position strictly through gravitational forces. The neutral position of control arm 34 is depicted in FIG. 3.

Figure 6:
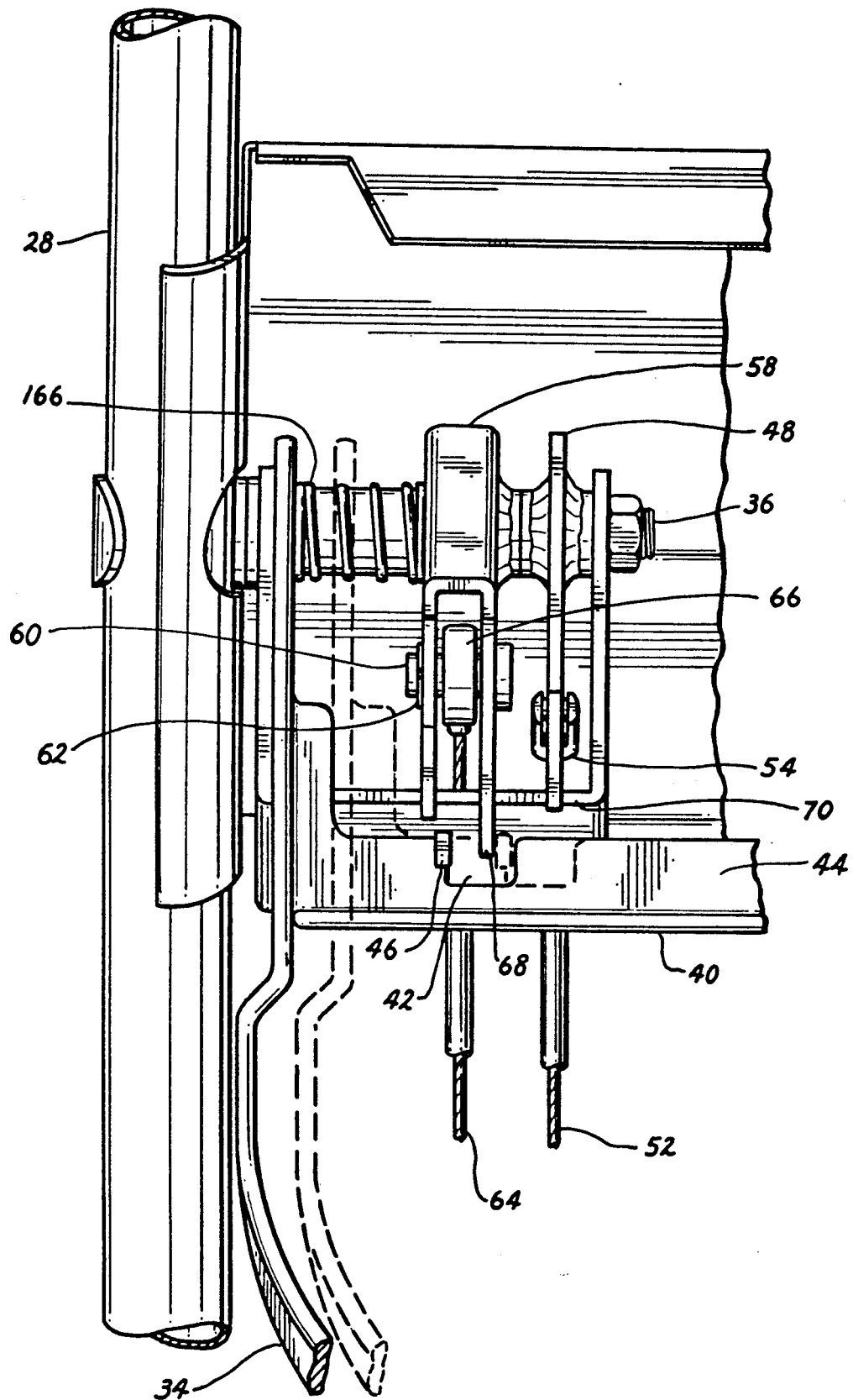
FIG. 6 is a rear elevational view of an enlarged portion of the preferred control mechanism shown in FIG. 2.

A generally U-shaped element 58 is connected to, and pivots about, shaft 36. Element 58 engages a pin 60 extending between the legs of the U-shaped (see FIG. 6) element 58. Pin 60 is axially restrained by a retaining ring 62. Cable 64 has an end 66 which is pivotally connected to the pin 60. Cable 64 is connected, at its end opposite to end 66, to the mower blade brake clutch 16. Movement of the cable 64 in an upward direction causes the BBC 16 to begin operating in its second mode wherein the brake is released from the mower blade 20 and the engine 12 and blade 20 are operatively coupled so that power is transmitted from the engine 12 to blade 20, causing the blade to rotate. Movement of the cable 64 in a downward direction causes the blade brake clutch 16 to return to its first mode wherein the blade 20 is braked and the engine 12 and blade 20 are mechanically disconnected so that no further transmission of power from the engine 12 to the blade 20 takes place. Movement of the cable 64 is controlled by the operator through movement of control arm 34. To move cable 64, the operator must first move the control arm 34 axially along shafts 36 and 38. A compression spring 166 mounted between control arm 34 and element 58 biases control arm 34 to a left position as shown in FIG. 6. To engage the blade brake clutch 16 into its second mode, the operator must move the control arm 34 to the right axially along shafts 36 and 38. In doing so, the notch 42 in, and the tab 46 on, the engagement surface 44 are displaced axially to the right of ear 68 which extends out from the right leg of element 58. As control arm 34 is then rotated upward, ear 68 of element 58 is contacted by engagement surface 44. Further rotation of control arm 34 causes ear 68 and element 58 to rotate with control arm 34 and engagement surface 44. Ear 68 of element 58 is contacted by engagement surface 44 of control arm 34 soon after control arm 34 leaves its neutral position. This contact occurs well before the engagement surface 44 contacts element 48 which is operatively coupled by a cable 52 to the transmission 26. Tab 46 also engages the right side of ear 68 of element 58 and prevents control arm 34, its engagement surface 44, and notch 42 from moving to the left axially along shafts 36 and 38. As element 58 rotates upward with control arm 34, cable 64 is axially displaced upward by cable end 66 which is pivotally connected to pin 60 which is mounted between the legs of element 58. The upward axial movement of cable 64 causes the BBC 16 to shift from its first mode to its second mode which, in turn, causes the blade 20 to be rotated by the engine 12. Further movement of the control arm in an upward direction causes the engagement surface 44 to contact and rotate the element 48 which, in turn, axially displaces cable 52 in an upward direction. The upward axial displacement of cable 52 engages the transmission 26 so that power is transmitted from the engine 12 to the wheels 22. As control arm 34 is rotated so that surface 56 approaches, and finally engages, gripping surface 32, the BBC 16 has been shifted from its first mode into its second mode and the transmission 26 has been engaged so that power is transmitted from the engine 12 to the wheels 22. If the operator releases the control arm 34, the transmission 26 and the BBC 16 exert force on cables 52 and 64, respectively, which tends to pull the cables 52 and 64 back towards the transmission 26 and the BBC 16. As described above, cable 52 and cable end 54 pull hook 50 downward, rotating element 48 downward. BBC 16, via cable 64 and cable end 66, pulls pin 60 downward, causing element 58 and ear 68 to rotate downward. Control arm 34 and its engagement surface 44 rotate downward too, falling back to the control arm 34 neutral position. Transmission 26 returns to a neutral position, stopping the transmission of power from the engine 12 to the wheels 22. BBC 16 returns to its first mode of operation wherein the blade 20 is braked preventing further rotation of it, and the engine 12 is operatively disconnected from the blade 20. Element 58 is pulled by cable 64 to the point where element 58 engages stop member 70, which prevents further rotation of element 58 and further movement of cable 64. Element 48 is pulled by cable 52 to the point where the transmission 26 is disengaged wherein element 48 stops its rotational movement as transmission 26 and cable 52 stop exerting force on element 48 when transmission 26 becomes disengaged. Control arm 34 continues to rotate downward due to gravitational forces. As control arm 34 continues to fall, tab 46 clears the now-stopped ear 68 of element 58. Control arm 34 is then free to move axially along shafts 36 and 38, and compression spring 166 then pushes control arm 34 to the left. Control arm 34 will return to its downward neutral position through gravitational force.

As described above, the operator can engage both the BBC 16 and the transmission 26, or just the transmission 26 depending on how the operator moves the control arm 34. To engage the transmission 26, the operator need only rotate the control arm 34 in the manner described above. To engage both the BBC 16 and the transmission 26, the operator must first move the control arm 34 axially and then rotate it in the manner described above. The operator can disengage the transmission 26 and/or the BBC 16 by releasing the control arm 34.

A preferred embodiment of the invention is described above. Those skilled in the art will recognize that many embodiments are possible within the scope of the invention. Variations and modifications of the various parts and assemblies can certainly be made and still fall within the scope of the invention. Thus, the invention is limited only to the apparatus, and method recited in the following claims, and equivalents thereof.

We claim:

1. In a walk-behind power lawn mower comprising a propelling means and a blade brake clutch, an improved control system comprising:
    (a) a control arm operatively coupled to said blade brake clutch and said propelling means; and
    (b) pivot means operatively connecting said control arm to said lawn mower, wherein the pivot means establishes a pivot axis;
    wherein said propelling means is engaged when said control arm is generally rotated about said pivot axis and wherein said blade brake clutch and said propelling means are engaged when said control arm is first generally displaced axially along said pivot axis and then generally rotated about said pivot axis.

2. The control system of claim 1, wherein said pivot means establishes a substantially horizontal pivot axis.

3. In a walk-behind power lawn mower comprising a deck, a propelling means, a blade brake clutch, and a handle assembly, an improved control system comprising:
- (a) a substantially U-shaped control arm;
- (b) pivot means operatively connecting said control arm to said handle assembly, wherein the pivot means establishes a pivot axis;
- (c) a first element pivotally coupled to said handle assembly and operatively connected to said propelling means; and
- (d) a second element pivotally coupled to said handle assembly and operatively coupled to said blade brake clutch;

wherein said first element is rotationally displaced and said propelling means is engaged when said control arm is generally rotated about said pivot axis and wherein said first and second elements are rotationally displaced and said propelling means and blade brake clutch are engaged when said control arm is first generally displaced axially along said pivot axis and then generally rotated about said pivot axis.

4. The control system of claim 3, wherein said pivot means establishes a substantially horizontal pivot axis.

5. The control system of claim 3, wherein said control arm further comprises an engagement surface and wherein said first and second elements are rotationally displaced when said engagement surface contacts said first and second elements upon rotation of said control arm about said pivot axis.

6. The control system of claim 3, wherein the first element is operatively connected to the propelling means by a cable and wherein the second element is operatively connected to the blade brake clutch by a cable.

* * * * *